United States Patent [19]

Walker et al.

[11] Patent Number: 4,764,288
[45] Date of Patent: * Aug. 16, 1988

[54] METHOD AND SYSTEM FOR CLEANSING A FILTER BED

[75] Inventors: Kenneth A. Walker, Lutherville; Richard A. Adie, Sykesville; Arthur J. Shapiro, Baltimore, all of Md.

[73] Assignee: Environmental Elements Corp., Baltimore, Md.

[*] Notice: The portion of the term of this patent subsequent to Oct. 14, 2003 has been disclaimed.

[21] Appl. No.: 913,338

[22] Filed: Sep. 30, 1986

Related U.S. Application Data

[63] Continuation-in-part of Ser. No. 760,258, Jul., 1985, Pat. No. 4,617,131.

[51] Int. Cl.[4] .............................................. B01D 23/24
[52] U.S. Cl. ................................... 210/793; 210/264; 210/276; 210/278
[58] Field of Search ............... 210/264, 275, 276, 277, 210/278, 284, 285, 793, 797, 798, 195.3, 333.01, 333.1, 411, 108

[56] References Cited

U.S. PATENT DOCUMENTS

| | | | |
|---|---|---|---|
| 2,302,449 | 11/1942 | Laughlin et al. | 210/275 |
| 3,239,061 | 3/1966 | Horning et al. | 210/793 |
| 3,907,686 | 9/1975 | Fletcher et al. | 210/411 |
| 4,133,766 | 1/1979 | Adie | 210/275 |
| 4,152,265 | 5/1979 | Meyers | 210/276 |
| 4,454,034 | 6/1984 | Astrom et al. | 210/275 |
| 4,540,487 | 9/1985 | Johnson et al. | 210/276 |
| 4,617,131 | 10/1986 | Walker | 210/794 |

Primary Examiner—Benoit Castel
Assistant Examiner—Richard D. Jordan
Attorney, Agent, or Firm—Morton J. Rosenberg

[57] ABSTRACT

There is provided an improved method of cleansing a filter bed utilizing a backwash pump (12) having an inlet line (14) and an outlet line (16). The improved method and system includes two cycle operations. Initially, the filter bed is backwashed to remove contaminants from the filter bed with the backwash pump (12) drawing liquid from an effluent channel (32) through a first diverter valve (18). The fluid flows through a second diverter valve (20) and a first throttling control valve (36) for insert into a backwash shoe (38). In the purging cycle, fluid may be recirculated from the backwash pump (12) through the backwash shoe (38) and then back to the backwash pump (12) with a portion of the fluid being diverted through a second diverter valve (20') into an egress line (42). In an embodiment of the purging cycle method and system (10'), during the purging cycle fluid is passed on backwash filter pump outlet line (16) from backwash pump (12) directly to an egress line (42) through the second diverter valve (20"). The pressure head of the backwash pump (12) is controlled by a second control valve (44) located in the egress line (42).

16 Claims, 3 Drawing Sheets

METHOD AND SYSTEM FOR CLEANSING A FILTER BED

RELATED PATENT APPLICATIONS

This patent application is a continuation-in-part of patent application Ser. No. 760,258, filed at the U.S. Patent and Trademark Office on July 29, 1985, now U.S. Pat. No. 4,617,131.

BACKGROUND OF THE INVENTION

1. Field of the Invention

This invention relates to an improved system and method of cleansing a filter bed. In particular, this invention relates to an automatic backwash filtering system. Further, this invention directs itself to an improved system for cleansing a filter bed utilizing two separate and distinct operation cycles, including a backwashing cycle and a purge cycle. Additionally, this invention relates to an automatic backwashing filter system which permits substantial utilization of identical fluid flow elements in both a backwashing operation and a purge operation. Still further, this invention relates to an automatic backwashing filter system wherein standard backwash pumps may be utilized by appropriate throttling techniques in both the backwash cycle and the purge cycle.

2. Prior Art

Automatic backwash filter systems are known in the art as exemplified in U.S. Pat. Nos. #3,239,061 and #4,133,766, assigned to the Assignee Corporation of this invention concept. However, such automatic backwash filters provide for a singular backwashing operation of the filter beds. It has been found in such prior art systems that there is a possibility that particulate solid contaminants or organisms have been found at the bottom of the filter bed subsequent to the backwashing operation. In such prior art systems, there is a possibility that the particulate material may pass through the filter underdrain and contaminate the filtrate. Additionally, such prior art systems do not purge the filter bed subsequent to the backwashing operation cycle for removal of further contaminants from the filter bed. Thus, in such prior art filtering systems, the safety factor does not provide for a maximization of the filtering of the overall filtering system.

Additionally, where it would be necessary to insert a purge cycle into the prior art filtering systems, such would be overly complicated by additional hardware and pumping consideration mechanisms which would increase the cost of such systems. Still further, additional hardware and pumping elements applied to prior art systems for the purge cycle would unnecessarily increase the volume considerations for such filtering systems.

PATENT DOCUMENTS INCORPORATED BY REFERENCE

U.S. Pat. Nos. #3,239,061 and #4,133,766 assigned to the same Assignee Corporation as the subject invention concept are herein incorporated by reference.

SUMMARY OF THE INVENTION

A method of cleansing a filter bed having a backwash pump including an inlet line and an outlet line. The method steps include backwashing the filter bed for initially removing contaminants from the filter bed. The backwash pump draws liquid from an effluent channel and operates at a predetermined pressure head. The backwash pump is controlled to the predetermined pressure head during a backwashing cycle. The filter bed is purged subsequent to the step of backwashing for removal of further contaminants from the filter bed. The step of purging includes the step of recirculating a first purging portion of liquid pumped by the backwash pump on the backwash pump outlet line through a backwash shoe for return to the backwash pump through the backwash pump inlet line. Finally, during the purging cycle, a second purging portion of the liquid is passed through an egress line.

DESCRIPTION OF THE PREFERRED EMBODIMENTS

Figure 1:
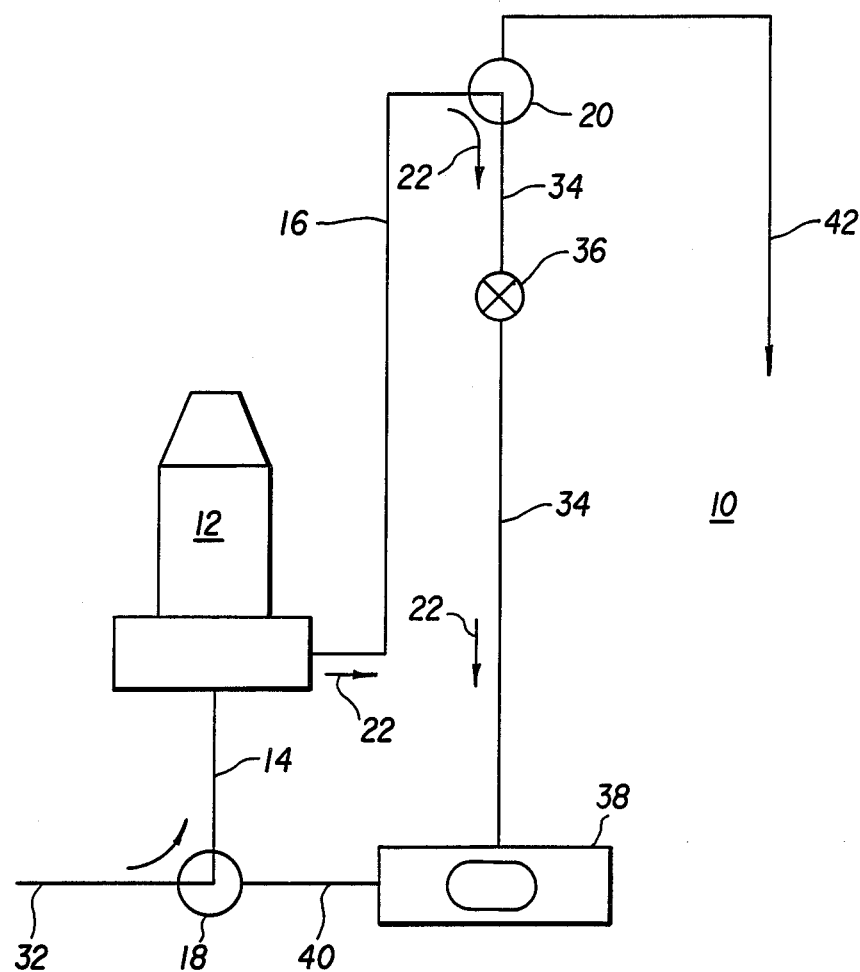
FIG. 1 is a schematic block diagram of the improved method and system of cleansing a filter bed showing the backwashing operation cycle.
Figure 2:
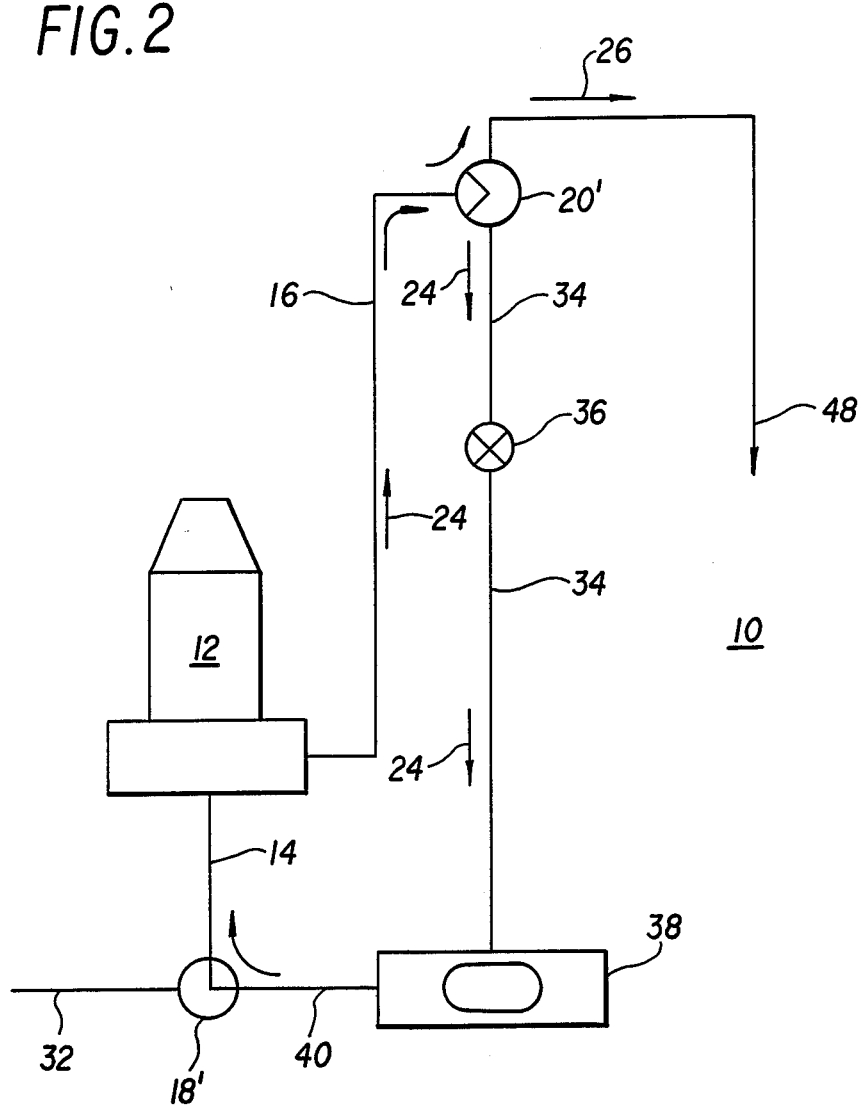
FIG. 2 is a schematic block diagram of a preferred embodiment of the method and system of cleansing a filter bed showing a preferred purge cycle system; and, FIG. 3 is a schematic block diagram of an embodiment of the improved method and system of cleansing a filter bed showing a purge cycle operation and elements associated therewith.
Figure 3:
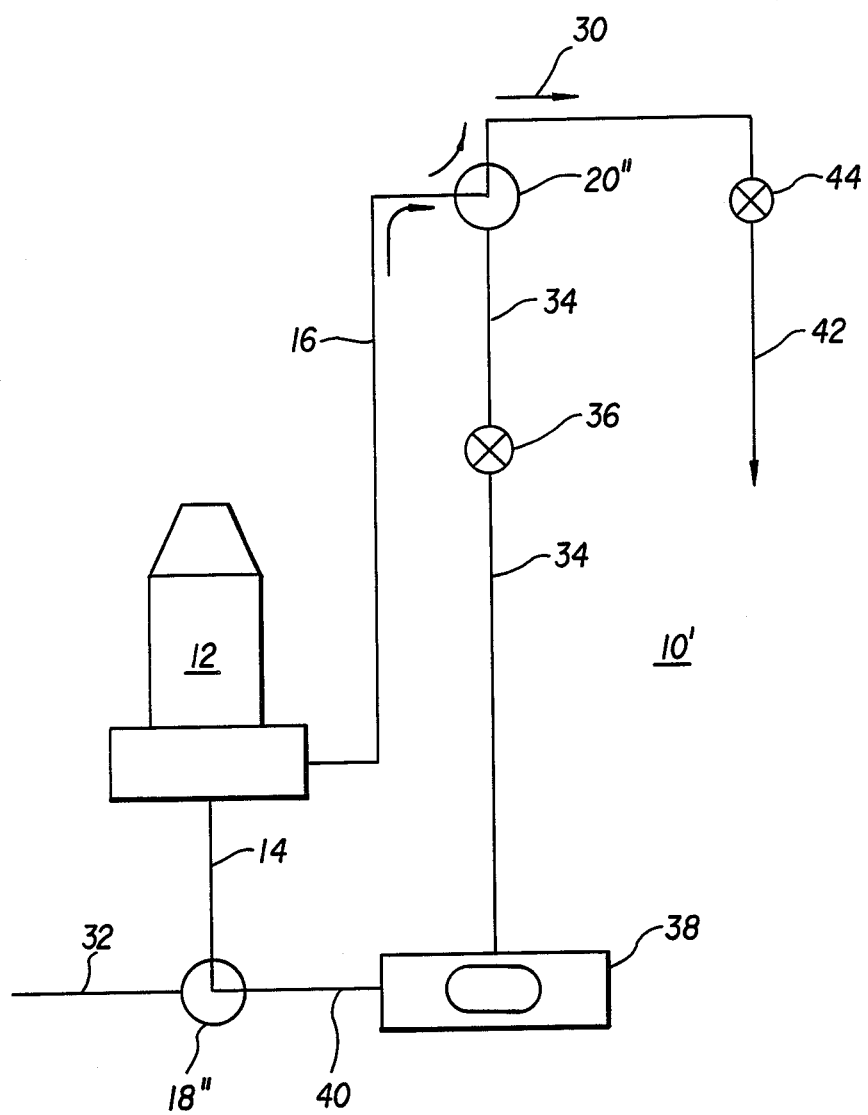

Referring now to FIGS. 1, 2 and 3, there is shown block diagrams relating to improved filter bed cleansing systems 10 and 10'. The subject filter bed cleansing system 10 and associated method of cleansing a filter bed is an improvement of cleansing systems shown and described in U.S. Pat. Nos. #3,239,061, and, #4,133,766, as well as U.S. patent application Ser. No. #760,258, now U.S. Pat. No. 4,617,131, filed on July 29, 1985 and assigned to the same Assignee Corporation as the subject cleansing system and method.

In overall concept, improved filter bed cleansing systems 10 and 10' as herein described are directed to automatic backwash filters which remove solid contaminants from water and waste water by passing fluid through a bed of granular media or material. As is well-known, as contaminant solids accumulate in a filter bed, the flow through the filter bed is reversed in order to dislodge collected particulate matter. The automatic backwash filter system as shown and described in the aforementioned U.S. patents generally consist of a standard backwash pump 12 to direct flow in a reversed flow mode through the media and may further include a second pump and collecting hood to trap any released solids for removal from the overall system.

For purposes of this description, the cleansing operation of passing the liquid in a reverse manner back through the media in the following paragraphs will be referred to as a backwash cycle or backwash operation, as is shown in the block diagram provided in FIG. 1.

Although the backwashing operation has provided a distinct improvement in the cleansing of filter beds, it has now been found that subsequent to the backwashing of filter cells that there is a possibility that extremely fine solid contaminants or organisms may be transported to the bottom of the disturbed filter media bed and that this material may possibly pass through the filter underdrain and deleteriously contaminate the final filtrate.

In some prior filtering system applications, material passing through the filter underdrain and contaminating the final filtrate has been found to be critical. Such criticality has been found where such systems are used for virus elimination applications. It has thus been determined that it may be of importance in various applications to increase the safety factor of the overall filtering system by diverting the filtrate to waste for a predetermined time interval after each filtering cell goes through the backwash operation or cycle as shown in FIG. 1.

In order to divert the filtrate to waste for some predetermined time interval after each filter cell goes through the backwash cycle, it has now been determined that a purge cycle as shown by block diagrams 2 and 3 may be utilized and have advantageous effects.

In order to accomodate a purging cycle as herein described, it is of importance to utilize a single backwash filter pump 12 incorporated in existing automatic backwash filter systems. The utilization of a single backwash filter pump 12 to accomodate both the backwash cycle or operation shown in FIG. 1 and the purge cycle as shown in FIGS. 2 and 3 is important in that complicated and additional pumping elements may be eliminated, as well as allowing for a low volume constraint of the overall filtering system.

Due to the fact that it is important to use a single backwash filter pump 12, such considerations led to problems in that the normal filter flow rate is much lower than the backwash flow rate. Thus, the backwash filter pump 12 must be throttled in order to prevent drawing excessive flow through the media during the purge phase of the cycle as is shown in FIGS. 2 and 3. In FIG. 2, there is shown a recirculation type of purge cycle whereas in FIG. 3, there is shown purge cycle not reliant upon recirculation. In any event, excessive flow through the media may cause a breakthrough of contaminants through the filter media bed and vitiate or nullify the effectiveness of the filtering system.

Due to the fact that throttling of standard backwash filter pumps 12 could not be obtained through large pressure head differences, a new piping system including a plurality of control valves for redirecting the flow of backwash pump 12 was devised in a manner such that the flow of filtered water may be drawn from the filter cell cleansed during the backwashing operation as was provided in patent application Ser. No. #760,258, filed on July 29, 1985. For ease of simplicity of operation, it was found that it was necessary to provide the same basic operating elements for both the backwash cycles shown in FIG. 1 of the subject Patent Application and the purge cycle operations shown in FIGS. 2 and 3 of the subject Application. The linking problem areas associated with the restraints as hereinbefore described has been now solved through utilization of the basic operating elements and method with the associated flow diversion shown in FIGS. 1, 2 and 3 of the subject Patent Application.

Referring now to the backwash cycle or operation as shown in FIG. 1 utilizing the concatenation of operating mechanisms which allows for identical mechanisms and elements to be utilized in both the backwash operation cycle of FIG. 1, as well as the purge cycles of either FIGS. 2 or 3, there is shown standard backwash filter pump 12 having backwash filter pump inlet line 14 and backwash filter pump outlet line 16.

Incorporated within the filter bed cleansing systems 10 and 10′ are first and second diverter valves 18 and 20. In FIG. 2, the diverter valves are given the elements numbers 18′ and 20′ in order to differentiate the operating modes of the diverter valves for providing differing flow paths between the backwash cycle operation and the purge cycle operation. Additionally, in FIG. 3, the diverter valves are given the elements numbers 18″ and 20″ to differentiate the operating modes of the diverter valves between the purge cycle system shown in FIG. 2 and the purge cycle system shown in FIG. 3.

Referring to first and second diverter valves 18 and 20 as provided in FIG. 1, such are commercially available pneumatically or electrically operated valve members with one such set of valves being used in the subject systems manufactured by Hayward Company of Elizabeth, N.J., having a Model Number NT 10300SACT Ported Ball Valve. Diverter valves 18 and 20 are generally multi-path valves for directing liquid flow in accordance with the directional arrow notation 22 of FIG. 1 for the backwash cycle, directional arrows 24 and 26 for a purge cycle operation, as shown in FIG. 2, and the directional arrows 28 and 30 as shown for the embodiment of the purge cycle as depicted in FIG. 3.

Referring to FIG. 1, the backwashing operation backwashes the filter system filter bed to initially remove contaminants from the filter bed with backwash pump 12 drawing liquid from effluent channel 32 through first diverter valve member 18 into backwash filter pump inlet line 14 and then subsequently internal to backwash filter pump 12. As can be seen in FIG. 1, during this backwashing operation, first diverter valve member 18 is set to provide a path from effluent channel 32 to backwash filter pump inlet line 14.

Subsequent to passage of the liquid through backwash pump 12, the liquid is then egressed through backwash filter pump outlet line 16 in the direction of notational flow direction arrows 22. Liquid then flows into second diverter valve 20 which is positionally set to pass fluid into backwash shoe inlet line 34.

In order to control the pressure head of the liquid passing through second diverter valve 20 of backwash pump 12, first control valve 36 is located in backwash shoe inlet line 34 for fluid communication with second diverter valve 20 and backwash shoe 38. A number of standard control valves may be used for first control valve 36, however, one commercially available control valve which has successfully been used is a Hayward True Union Ball Valve having a one or two inch bore being produced by the Hayward Corporation of Elizabeth, N.J. Throttle or first control valve 36 controls the amount of liquid necessary for proper fluidization of the media within the filter. In general, first control valve 36 may be manually controlled and normally may pass through approximately 20.0 gallons per minute per square foot of filter area. Standard backwash pumps 12 normally have a capability of as much as 40.0 gallons per minute per square foot flow rate and throttling of the liquid flow by first control valve 36 permits a controlled flow rate by control of the pressure head on backwash pump 12.

Referring now to the purge cycle operation shown in FIG. 2, there is provided cleansing system 10 which is initiated subsequent to the backwashing operation shown in FIG. 1. In general, a first portion of liquid pumped by backwash pump 12 is recirculated on backwash pump outlet line 16 and backwash shoe inlet line 34 to backwash shoe 38 and then returned to backwash pump 12 through backwash shoe outlet line 40. The recirculation portion of the liquid flow is shown by directional arrows 24 forming a closed loop including backwash pump 12 and backwash shoe 38. In this manner, backwash pump 12 is fluidly coupled to backwash shoe 38 by first diverter valve 18' being placed in the position shown in FIG. 2 in order to provide the fluid coupling between backwash pump 12 and backwash shoe 38.

Additionally, second diverter valve 20' is positionally located to permit bleed-off of a second portion of liquid passing through backwash filter pump outlet line 16 as depicted by directional arrows 26. Second diverter valve 20' is rotated sufficient to allow partial discharge through purge line 48 at a desired purge rate. The remaining portion of the liquid flow continues to pass through first control valve 36 and backwash shoe inlet line 34. Rotation of second diverter valve 20' may be adjusted by physical stops to obtain the bleed-off of approximately 2.0–5.0 gallons per minute per square foot of filter area. Thus, in this mode of operation, no throttling valve is needed in line 48 as will be provided in the embodiment shown for FIG. 3.

As has been previously described, first diverter valve 18 establishes fluid coupling between effluent channel 32 and backwash pump 12 during the backwashing of the filter bed as is indicated by the fluid flow position of first diverter valve 18 in FIG. 1. Additionally, first diverter valve 18 is switched to a position depicted by element 18' and establishes a fluid coupling between backwash shoe 38 and backwash pump 12 during purging of the filter bed as is indicated by the positional location of first diverter valve 18' as shown in FIG. 2.

A second purging portion of the liquid passing through backwash filter pump outlet line 16 is diverted into egress line 48 through the positional placement of second diverter valve 20', as has been described. In this manner, the second portion of liquid being bled passes through egress line 48 for eventual passage to a filter member for refiltering or to a waste tank, or some like disposal area not important to the inventive concept as herein described.

As applicable to all of the embodiments of cleansing system 10 or 10', the hydraulics of the system provide that during the backwashing operation or cycle, a substantial amount of flow is necessitated to pass from effluent channel 32 and discharge into backwash shoe 38 in the underdrain of the filtering system. The backwashing operation may call for a flow which approximates 20.0 gallons per square foot of filter bed area being cleaned, however, during a normal filter cycle, the flow of liquid to the filter may only approximate 2.0 gallons per square foot of filter bed.

If the backwash pump 12 were allowed to draw liquid during the purge cycle at the normal backflow rate of approximately 20.0 gallons per square foot, there would undoubtedly be a substantial spike or increase of purge flow as opposed to normal filter flow. Liquid would then be drawn through the filter bed at a rate of approximately 20.0 gallons per minute per square foot, as opposed to approximately 2.0 gallons per minute per square foot normally obtained during a filtering cycle. The increase of flow would tend to draw solids through the filter bed and decrease to a substantial degree the filtering performance of the system. Thus, there is great necessity in the utilization of first control valve 36 to provide throttling of backwash pump 12, as has been previously described.

One of the objectives of improved filter bed cleaning system 10 or 10' is to be able to pull flow and empty out the flow from the filter bed in the underdrain that contaminates water with this flow at essentially the same rate as if such were allowing the filter to pass flow during its normal filtering cycle. Improved filter bed cleaning systems 10 and 10' allow water to be backwashed through the filter at a rate approximating 20.0 gallons per minute per square foot during the backwashing cycle and in the purge cycle to draw such out at approximately 2.0 gallons per minute per square foot with the identical backwash filter pump 12 being utilized for both operations or cycles. It is understood that commercially available backwashing filter pumps 12 do not allow throttling of such pumps in a practical manner, since such pumps tend to operate in an unstable portion of the pump flow characteristic curves.

Referring to FIG. 3, there is shown cleansing system 10' which is an embodiment of cleansing system 10 shown in FIGS. 1 and 2. In the purge operation or cycle shown in FIG. 2 of cleansing system 10, there is a partial bypass and recirculation of fluid as has been described. In cleansing system 10', operation during the purge cycle is accomplished by switching the state of second diverter valve 20 into a state depicted by element 20''. In this variation of the purge cycle, second control valve 44 is inserted into egress line 42 to control the pressure head of backwash pump 12 in the manner described for first control valve 36. Second control valve 44 may also be a Hayward True Union Ball Valve having a one or two inch bore, manufactured by the Hayward Company of Elizabeth, N.J.

In cleansing system 10' as depicted in FIG. 3, flow passes through backwash filter pump outlet line 16 and second diverter valve 20'' as depicted by the fluid flow notational arrows 30. In this embodiment, during the purging cycle, there is no flow through backwash shoe inlet line 34. By manually or otherwise adjusting second control valve 44, pressure heads may be controlled in cleansing system 10'. Fluid passing through egress line 42 may then be dumped to a waste tank or other like system external to cleansing system 10', as is herein described.

In one form of a method of cleansing a filter bed as depicted in FIGS. 1 and 2, there is provided backwash pump 12 including inlet line 14 and outlet line 16. The cleansing of the filter bed includes the steps of backwashing the filter bed for initially removing contaminants from the filter bed. Backwash pump 12 draws liquid from effluent channel 32 and operates at a predetermined pressure head. During the backwashing operation, backwash pump 14 has its pressure head controlled through actuation of first or throttling control valve 36.

Subsequent to the backwashing operation, there is a purging of the filter bed for removal of further contaminants from the filter bed. The step of purging includes the step of recirculating a first purging portion of liquid pumped by backwash pump 12 as depicted by the flow directional arrows 24. The fluid flows through backwash shoe 38 and is returned to backwash pump 12 through pump inlet line 14. A second purging portion of liquid is simultaneously pumped by backwash pump 12 through egress line 48, as is shown in FIG. 2.

In an embodiment of the method of cleansing a filter bed, there is provided cleansing system 10' which directs itself to FIGS. 1 and 3. In this embodiment, there is provided backwash pump 12 having inlet and outlet lines 14 and 16 respectively. As in cleansing system 10, the filter bed is backwashed for initially removing contaminants from the filter bed with backwash pump 12 drawing liquid from effluent channel 32 and backwash pump 12 operates at a predetermined pressure head.

During the backwashing operation or cycle, the predetermined pressure head of backwash pump 12 is controlled by first control valve 36.

Subsequent to the backwashing cycle, the filter bed is purged for removal of further contaminants from the filter bed with the step of purging including the step of passing liquid from backwash pump 12 through backwash filter pump outlet line 16 and then into egress line 42 through second diverter valve 20″. The pressure head of backwash pump 12 during this cycle or operation is controlled by second control valve 44 as is seen. It is to be understood that in the embodiment of cleansing system 10′, there is no recirculation of fluid through the backwash shoe 38 as was the case for the operation of cleansing system 10, shown in FIGS. 1 and 2.

Although this invention has been described in connection with specific forms, steps and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims. Additionally, equivalent method steps may be provided in some cases, and certain steps may be used independently of others or interposed without further departing from the spirit or scope of the invention as also defined in the appended claims.

What is claimed is:

1. A method of cleansing a filter bed and improving the quality of its filtrate, having a backwash pump including an inlet line and an outlet line comprising the steps of:
   (a) backwashing said filter bed for initially removing contaminants from said filter bed, said backwash pump drawing liquid from an effluent channel and operating at a predetermined pressure head, said backwashing step further including the step of inserting a first diverter valve between said backwash pump inlet line and said effluent channel for drawing said liquid into said backwash pump;
   (b) controlling said predetermined pressure head of said backwash pump during said step of backwashing said filter bed; and,
   (c) purging said filter bed subsequent to said step of backwashing for removal of further contaminants from said filter bed using said backwash pump, said step of purging including the steps of further controlling said backwashing pump pressure head by recirculating a first purging portion of liquid pumped by said backwash pump on said backwash pump outlet line through a backwash shoe for return along with a portion of said filtrate to said backwash pump through said backwash pump inlet line, and passing a second purging portion of said liquid pumped by said backwash pump through an egress line to waste.

2. The method of cleansing a filter bed as recited in claim 1 where the step of backwashing includes the step of passing said liquid being pumped through said backwash pump outlet line to said backwash shoe through a backwash shoe inlet line in fluid communication with said backwash pump outlet line.

3. The method of cleansing a filter bed as recited in claim 2 where the step of controlling said predetermined pressure head includes the step of providing a backwash pump pressure head valve in said backwash shoe inlet line for maintaining said backwash pump predetermined pressure head.

4. The method of cleansing a filter bed as recited in claim 1 where the step of purging includes the step of drawing at least a portion of said first purging portion of said liquid and at least a portion of said filtrate through said first diverter valve for insert into said backwash pump.

5. The method of cleansing a filter bed as recited in claim 1 where the step of backwashing includes the step of inserting a second diverter valve between said backwash pump outlet line and said backwash shoe inlet line for passing said first purging portion of said liquid pumped by said backwash pump to said backwash shoe.

6. The method of cleansing a filter bed as recited in claim 5 where the step of purging includes the step of drawing said second purging portion of said liquid through said second diverter valve to said egress line.

7. A method of cleansing a filter bed having a backwash pump including an inlet line and an outlet line comprising the steps of:
   (a) backwashing said filter bed for initially removing contaminants from said filter bed, said backwash pump drawing filtrate from said filter bed through an effluent channel and pumping said filtrate to a backwash shoe, said backwash shoe being fluidly coupled to said backwash pump outlet line, said backwash pump operating at a predetermined pressure head, said backwashing step further including the step of inserting a first diverter valve between said backwash pump inlet line and said effluent channel for drawing said liquid into said backwash pump;
   (b) controlling said predetermined pressure head of said backwash pump during said step of backwashing;
   (c) purging said filtrate from said filter bed subsequent to said step of backwashing for removal of further contaminants from said filter bed, said step of purging including the step of transferring the fluid coupling between said backwash pump inlet line from said effluent channel to said backwash shoe for drawing at least a portion of said filtrate from said filter bed through said backwash shoe, and transferring the fluid coupling between said backwash pump outlet line from said backwash shoe to an egress line for pumping said purged filtrate to waste; and,
   (d) controlling said pressure head of said backwash pump during said step of purging.

8. The method of cleansing a filter bed as recited in claim 7 where the step of backwashing includes the step of pumping said filtrate to said backwash shoe from said backwash pump through a backwash shoe inlet line.

9. The method of cleansing a filter bed as recited in claim 8 where the step of controlling said predetermined pressure head of said backwash pump includes the step of providing a first backwash pump pressure head valve in said backwash shoe inlet line.

10. The method of cleansing a filter bed as recited in claim 9 where the step of controlling said pressure head of said backwash pump during said step of purging includes the step of providing a second backwash pump pressure head valve in said egress line.

11. An improved media filter cleansing system having a filter tank divided into a multiplicity of cells, a bed of filter media located on support plates mounted within said cells, influent means for delivering fluid to be treated to the top of said filter media bed, effluent means for removing the treated filtrate from the bottom of said filter media bed and backwashing means, said backwashing means including a backwash pump for driving a backwashing fluid upward through said filter bed for removing contaminants contained therein wherein the improvement comprises:

(a) means for fluidly coupling an outlet line from said backwash pump to (1) a backwash shoe during a purge cycle, or, (2) an egress line, or, (3) both said backwash shoe and said egress line;

(b) means for fluidly coupling an inlet line from said backwash pump to (1) said backwashing fluid, or, (2) said filtrate through said backwash shoe, said means for fluidly coupling including means for recirculating said backwashing fluid from said backwash shoe to said backwash pump, further including a backwash shoe outlet line in fluid communication with said backwash shoe, and a first diverter valve member for fluidly coupling said backwash shoe outlet line to said backwash pump; and, (c) means for controlling a pressure head of said backwash pump to a predetermined value.

12. The improved media filter cleansing system as recited in claim 11 where said first diverter valve member is a two-way valve.

13. The improved media filter cleansing system as recited in claim 11 where said first diverter valve member (1) fluidly couples said backwash pump to said effluent means during a backwashing operation of said filter media; and, (2) fluidly couples said backwash shoe to said backwash pump during a purging operation.

14. The improved media filter cleansing system as recited in claim 11 where said means for fluidly coupling an outlet line from said backwash pump includes:

(a) a backwash filter pump outlet line; and,
(b) an outlet control diverter valve member for fluidly coupling said backwash pump outlet to said (1) backwash shoe, and (2) egress line.

15. The improved media filter cleansing system as recited in claim 14 where said means for controlling said pressure head of said backwash pump includes a first flow adjustable valve member in fluid communication with said outlet control diverter valve member and said backwash shoe for controlling said backwash pump pressure head to said predetermined valve during a backwashing operation.

16. The improved media filter cleansing system as recited in claim 14 where said means for controlling said pressure head of said backwash pump includes a second flow adjustable valve member located in said egress line and in fluid communication with said outlet control diverter valve member for controlling said backwash pump pressure head to said predetermined value during a purging operation.

* * * * *